United States Patent [19]

Wada et al.

[11] Patent Number: 4,828,905
[45] Date of Patent: May 9, 1989

[54] MAGNETIC RECORDING MEDIUM

[75] Inventors: Toshiaki Wada, Takatsuki; Masateru Nose, Kusatsu, both of Japan

[73] Assignee: Sumitomo Special Metals Co., Ltd., Osaka, Japan

[21] Appl. No.: 60,454

[22] Filed: Jun. 11, 1987

[30] Foreign Application Priority Data

Jun. 12, 1986 [JP] Japan .................... 61-136443
Jun. 12, 1986 [JP] Japan .................... 61-136444

[51] Int. Cl.$^4$ ............................................. G11B 5/64
[52] U.S. Cl. ............................ 428/213; 427/131; 427/132; 428/215; 428/336; 428/694; 428/900
[58] Field of Search ............ 428/694, 695, 900, 213, 428/215, 336; 427/131, 132

[56] References Cited

U.S. PATENT DOCUMENTS 4,411,963 10/1983 Aine ..................... 428/694
4,631,202 12/1986 Opfer et al. ............. 427/131
4,695,510 9/1987 Sawamura et al. ......... 428/694

FOREIGN PATENT DOCUMENTS 59-203223 11/1984 Japan .................... 427/131
61-199236 9/1986 Japan .................... 428/694

Primary Examiner—Paul J. Thibodeau
Attorney, Agent, or Firm—Burns, Doane, Swecker & Mathis

[57] ABSTRACT

In a magnetic recording medium in which a metallic base layer and a magnetic layer are provided on a nonmagnetic nonmetallic substrate, an intermediate layer is additionally formed between the substrate and the metallic base layer in order to improve peeling-off resistance of the metallic base layer for durability against magnetic head contact-start-stop operation. The intermediate layer is a metal oxide layer including at least one of specified elements, or a composite layer made up of the metal oxide layer and a metal or alloy layer including at least one of the same specified elements and formed on the metal oxide layer. The specified element include Ti, Zr, Hf, V, Nb, Ta, Cr, Mo, W and Mn. Oxygen concentration in the oxide layer may decrease toward the metallic base layer. The oxide layer may be replaced by nitride layer of these metals.

25 Claims, 2 Drawing Sheets

SPUTTERING TIME (MIN)

MAGNETIC RECORDING MEDIUM

BACKGROUND

The present invention relates generally to an improvement of a magnetic recording medium applicable as magnetic disks, in which a metallic magnetic film is formed on a nonmetallic substrate such as ceramics, glass or their composite material via a metallic magnetic film-supporting base layer (referred to as base layer, hereinafter), and more specifically to a magnetic recording medium provided with an excellent durability against magnetic head contact-start-stop operation by forming an intermediate layer between the nonmetallic substrate and the metallic base layer to prevent peeling-off of the metallic base layer.

Magnetic disks have been widely used as storage devices in various information processing systems such as computers. In order to improve the information processing ability, recently higher density and larger capacity are both required for the magnetic disk devices, and therefore metallic films formed by sputtering or ion plating technique have been in the course of practical use as magnetic recording layers of the magnetic disks.

In general, an aluminum alloy plate onto which Ni-P plating is applied is used as a substrate for the magnetic recording medium; however, it has been reported that there exist various problems such that the substrate itself suffers elongation by high speed disk revolution, and errors in writing/reading due to thermal expansion, etc. Further, since the Ni-P plating layer is generally formed by wet plating it has been known that moisture or various ions usually remain in the plated layer, thus resulting in corrosion of the metallic base layer and the magnetic layer and therefore to offer causes for said errors.

To overcome the above-mentioned problems, a magnetic disks in which a reinforced (tempered) glass or various ceramic substrates are used has been proposed, and further a magnetic disk in which a magnetic layer is formed on a ceramic substrate via a glazed layer has been proposed (in Japanese Patent Kokai Publication No. 60-138730).

In the magnetic disk in which a metallic base layer and a magnetic film are laminated on the various nonmetallic substrates as described above, peeling-off between the nonmetallic substrate and the metallic base layer often occurs due to strain caused by a difference in the thermal expansion coefficients between the nonmetallic substrate and the metallic base layer, or through friction or impact between a magnetic head and the magnetic disk in use particularly when the magnetic head starts or stops on the disk, thus causing errors in the writing/reading operation. In addition, it would result in a serious problem as so-called drop-out of memory.

Further, as a method of solving the above-mentioned peeling-off problem on the metallic base layer, a metallic substrate (e.g., aluminum substrate) in which the peeling-off is to be prevented by intervening a coexistent area between a nonmagnetic metallic substrate and a metallic base layer has been disclosed in Japanese Patent Kokai Publication No. 61-54016. However, this technique cannot solve the aforementioned drawbacks peculiar to the metallic substrate, and further is not applicable to a method for preventing the peeling-off between the nonmetallic substrate and the metallic base layer. In summary, there exists a strong demand for preventing the peeling-off of the metallic base layer from the nonmetallic substrate.

SUMMARY OF THE DISCLOSURE

An object of the present invention is to provide a novel magnetic recording medium in which a metallic magnetic film is formed on a nonmetallic substrate via a metallic base layer.

Another object of the present invention is to provide a magnetic recording medium applicable as magnetic disks, wherein a metallic magnetic film is laminatedly formed on a nonmetallic substrate such as ceramics or glass via a metallic base layer, a metallic base layer is strongly adhered on the nonmetallic substrate, so that the base layer is prevented from peeling-of due to its excellent durability against magnetic head contact-start-stop operation (referred to as CSS, hereinafter).

Further object of the present invention will become apparent in the entire disclosure of the invention.

As a result of various researches for improving the adhesive strength between the nonmetallic substrate and the metallic base layer, the present invention has been achieved on the basis of the findings that: in forming the metallic base layer on the nonmetallic substrate, it is possible to obtain an extremely strong adhesion layer by, between the substrate and the base layer, intervening an intermediate layer of a specific metal oxide or an intermediate layer structure made up of a specific metal oxide layer and a specific metal or alloy layer. In the metallic base layer thus formed, the adhesive strength is not reduced due to heat cycle applied during the manufacturing process, and further there is provided an excellent durability against peeling-off through magnetic head CSS.

According to a first aspect of the present invention, the magnetic recording medium in which a metallic base layer and a magnetic layer are laminatedly formed on a nonmagnetic nonmetallic substrate is characterized in that an intermediate layer of a metal oxide layer comprising at least one element selected from the group consisting of Te, Zr, Hf, V, Nb, Ta, Cr, Mo, W, and Mn intervenes between the substrate and the metallic base layer.

According to a second aspect of the present invention, the magnetic recording medium is characterized in that an intermediate layer structure, intervenes between the substrate and the metallic base layer, said intermediate layer structure comprising a metal oxide layer disposed on the substrate and a metal or alloy layer disposed on the metal oxide layer, the metal oxide layer comprising oxide(s) of at least one metal element selected from the group consisting of Ti, Zr, Hf, V, Nb, Ta, Cr, Mo, W and Mn, and said metal or alloy layer comprising at least one metal element selected from the group consisting of Ti, Zr, Hf, V, Nb, Ta, Cr, Mo, W and Mn.

According to a third aspect, the metal oxide layer of the second aspect can be replaced by a metal nitride layer of the same metal elements.

DESCRIPTION OF THE PREFERRED EMBODIMENT

Figure 1:
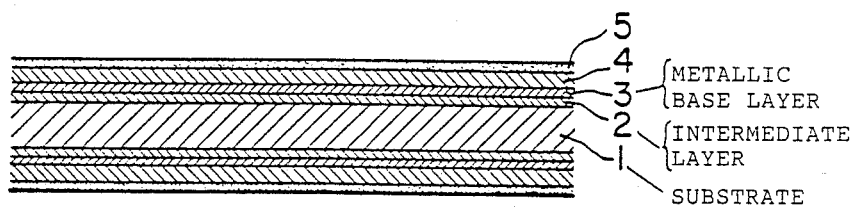
FIG. 1 is a cross-sectional view showing an embodiment of a magnetic disk of the present invention in which a metal oxide layer intervenes as an intermediate layer between a substrate and a metallic base layer.

In an embodiment of the magnetic recording medium according to the present invention as shown in FIG. 1, an intermediate layer (2) made of at least one metallic oxide layer comprising oxide(s) of at least one element selected from the group consisting of Ti, Zr, Hf, V, Nb, Ta, Cr, Mo, W and Mn is laminatedly formed on a nonmagnetic nonmetallic substrate (1) such as various ceramics, glass or glass-glazed ceramics; a metallic base layer (3) such as Cr or permalloy alloy etc. selected according to the magnetic layer composition is laminatedly formed on the intermediate layer (2); a required magnetic layer (4) such as Co-Ni alloy is laminated formed on the base layer (3); and further a protective film (5) is coated on the magnetic layer (4) where necessary.

Figure 3:
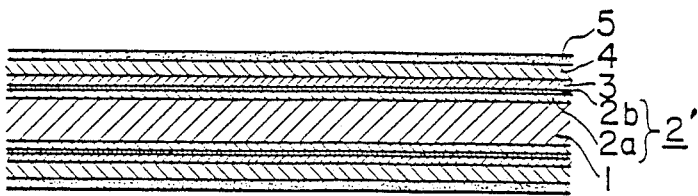
FIG. 3 is a cross-sectional view showing another embodiment of the magnetic disk of the present invention in which a metal oxide layer and a metal layer intervene as an intermediate layer structure between the substrate and the metallic base layer.

In another embodiment of the magnetic recording medium as shown in FIG. 3, an intermediate layer structure (2') made up of a metallic oxide layer (2a) and a metallic or alloy layer (2b), is laminatedly formed on a nonmagnetic nonmetallic substrate (1), the metal oxide layer (2a) comprising oxide(s) of at least one metal element selected from the group consisting of Ti, Zr, Hf, V, Nb, Ta, Cr, Mo, W and Mn, and the metallic or alloy layer (2b) comprising at least one of the above-mentioned specified metals. The substrate (1) is made of various ceramics, glass or glass-glazed ceramics. Further, a metallic base layer (3) such as Cr or permalloy alloy etc. selected according to magnetic layer composition is laminatedly formed on the intermediate layer structure (2'); a required magnetic layer (4) such as Co-Ni alloy is formed on the base layer (3); and further a protective film (5) is coated on the magnetic layer (4) where necessary.

In every exemplary constitution, since the metallic base layer (3) is strongly adhered to the nonmetallic substrate (1) via the intermediate layer (2) or the intermediate layer structure (2'), the recording medium is stable in strength, resistant against peeling-off due to mechanical impact and/or thermal shock, and therefore durable against magnetic head CCS for a prolonged period of time. Further, when the intermediate layer (2) or layer structure (2') is formed with such characteristics that the oxygen concentration is decreased continuously or stepwise along a thickness direction thereof toward the metallic base layer (3), it is possible to further increase the adhesive strength between the metallic base layer (3) and the intermediate layer (2) as well as to decrease strain caused by a difference in the thermal expansion coefficients between the nonmetallic substrate (1) and the metallic base layer (3). Therefore, there exists an advantage that resistance to peeling-off can be improved and therefore the recording medium can be more easily heated or cooled during the manufacturing process.

Note, the term "oxide layer" herein is used for a layer such that the amount of metal elements constituting the oxide amounts to at least 50 at % per the entire metal elements present in the layer.

The substrate for the magnetic recording medium of the present invention is a nonmagentic nonmetallic material, for instance such as various ceramics of alumina, silicon carbide, titanium carbide, zirconia, silicon nitride, alumina-silicon carbide, tempered glass, or crystallized glass. Further, a substrate in which glass glazing is effected on a ceramic substrate such as alumina can be employed, too.

For the metallic base layer of the magnetic recording medium according to the present invention, various metals can be appropriately selected. For instance, in the case of longitudinal magnetic recording medium using a Co-Ni base alloy as the magnetic layer, Cr is usually used for the base layer. However, other metals may be also employed so far as the crystal orientation can be controlled in the magnetic layer to ensure a high coercive force. Further, in the case with a perpendicular magnetic recording medium, permalloy or Ti is used for the base layer.

As to the intermediate layer (or layer structure) intervening between the nonmetallic substrate and the metallic base layer to increase the adhesive strength between the two, of the present invention, use is made of a metal oxide of at least one metal element selected from IVa, Va, VIa, and VIIa groups of the International Periodic Table, that is, Ti, Zr, Hf, V, Nb, Ta, Cr, Mo, W and Mn (referred to as specified metals). In more detail, unless the intermediate layer (or layer structure) includes at least one oxide of the above specified metals or oxide(s) composed of the above specified metals and other metals, there is no significant improvement in the adhesive strength between the nonmetallic substrate and the metallic base layer, although metal oxides other than the above specified metals are allowed to be included in the intermediate layer. The reason is considered as follows: when the intermediate layer (or layer structure) includes the above-mentioned specified metal, an interatomic bonding can be readily attained between the intermediate layer and the nonmetallic substrate, so that the interfacial bonding strength can be increased.

As the metals other than the above-specified metals, Cu, Ni, Fe, Co, Al, Re, Pt, Be, etc. may be present together with the above specified metals. However, when a strong-magnetic metal is used therewith, it is necessary to adjust the composition so that the residual magnetic flux density (residual magnetization) is several tens G or less.

The total amount of the specified metals should be at least 30 at % of the total metallic elements constituting the oxide(s) in the intermediate layer, and preferably 50 at % or more.

It is preferred that the thickness of the intermediate layer composed of the metal oxide(s) including at least one of the above specified metals is 1/1000 to 5 times thick relative to that of the metallic base layer formed thereon. Generally, the thickness of the intermediate layer is selected corresponding to that of the metallic base layer.

The metallic base layer is formed usually 1000 to 10000 Å thick.

Generally, the thickness of the intermediate layer may be selected depending upon the kind of the metal employed, too. For instance the thickness for Cr oxide is preferably less than 50 Å, more preferably less than 20 Å, or most preferably less than 10 Å. Note, for a Cr nitride intermediate layer, it is preferably more than 50 Å, more preferably more than 100 Å, or most preferably more than 300 Å.

Further, in the second aspect of the present invention in which an oxide layer and a metal or alloy layer are laminated to form an intermediate layer structure, it is preferred to form the intermediate layer structure by first laminating an oxide layer (1st layer) on the substrate and then laminating the metal or alloy layer (2nd layer) on the first layer to obtain a composite layer structure.

The thickness of the metal or alloy layer is preferably 1/10 to 10 folds with respect to that of the oxide layer.

The oxygen concentration of the intermediate layer of the present invention depends upon the layer-forming method and conditions. However, it is possible to obtain an effect of improving the adhesive strength between the nonmetallic substrate and the metallic base layer in a wide range of the oxygen concentration in the intermediate layer structure. Therefore, it is not always necessary to stoichiometrically determine the composition ratio of the metallic element to oxygen element in the oxide layer.

Further, the intermediate layer structure can be formed into multilayers by laminating oxides of the above-mentioned specified metals. In this case, if the oxides are selected so that the thermal expansion coefficients of the oxides change stepwise in the multilayers, it is possible to reduce strain caused by a difference in the thermal expansion coefficients between the nonmetallic substrate and the metallic base layer.

The constitution of the oxide which forms the intermediate layer varies according to the layer forming method and conditions. For instance, in the case where the intermediate layer is formed by sputtering, various oxides are included according to target composition and sputtering conditions; and the intermediate layer may be formed into various crystal structures and mixed phases. Therefore, the intermediate layer structure can be formed in different ways as follows: oxygen concentration may be roughly uniform throughout the intermediate layer structure; or oxygen concentration may vary along the thickness direction of the intermediate layer structure; and there may be a mixed phase structure of oxide phase and metal phase, depending upon certain oxygen concentration.

As the method of forming the intermediate layer made of oxide of the present invention, various methods can be employed. That is, the oxide layer can be formed by sputtering with a metal oxide target including at least one of the specified metals, or by sputtering within an atmosphere including oxygen with a metal target including at least one of the specified metals, or by coating an oxide as described above by CVD. Or else, first a metallic film including at least one of the above specified metals is formed in accordance with dry film deposition technique such as sputtering, CVD, vacuum deposition, ion plating or wet film forming technique such as plating, and then the formed metallic film is oxidized into an oxide layer within air, oxygen or highly wet hydrogen atmosphere.

Similarly, as the method of forming the intermediate layer structure composed of the oxide layer and the metal layer, the oxide layer including at least one specified metal can be formed as follows: forming a metal oxide film of at least one of the specified metals; e.g., by sputtering with a metal oxide target including at least one of the specified metals, followed by forming a metal film by sputtering with a metal or alloy target including at least one of the specified metals; Or else, the metal film may be formed by dry film deposition technique such as sputtering, CVD, vacuum deposition, ion plating etc. or by wet film forming technique such as plating; thereafter the formed metallic film is oxidized into an oxide layer within air, oxygen or highly wet hydrogen atmosphere; and finally a metallic or alloy film including the specified metal is further formed thereon in accordance with various technique as already mentioned.

Further, it is also possible to obtain a strong adhesive strength by another method such that a metal or alloy film including at least one of the specified metals is formed in accordance with various technique as described above and thereafter the formed film is heated within a non-oxidizing atmosphere to cause mutual diffusion or reaction between the oxide substrate and the metallic film.

Further, as a method of forming the intermediate layer in which oxygen concentration is decreased continuously or stepwise toward the metallic base layer, the oxygen concentration in the oxide layer is appropriately controlled by intermixing certain amount of oxygen with the atmosphere, when the film is formed in accordance with sputtering, vacuum deposition, ion plating, ion-beam sputtering, etc. with an evaporation source of a metal including at least one of the specified metals. That is, it is possible to substantially continuously or stepwisely decrease the oxygen concentration of the intermediate layer along the thickness direction toward the metallic base layer.

In particular, where a metal or alloy layer is laminated on an oxide layer in which the oxygen concentration changes, after an oxide layer has been formed by the method as described above, a specified metal or alloy layer can be formed thereon by sputtering within an atmosphere containing no oxygen.

EXAMPLES

Example 1

A magnetic disk of the present invention was manufactured as follows: a 0.001 μm thick chromium oxide intermediate layer was formed on a tempered glass substrate (Asahi Glass Co., Ltd. reinforced by alkali ions, surface roughness: Ra of about 20 Å) by sputtering with a Cr target within an oxygen and argon mixture atmosphere (ratio: 1:9); a 0.3 μm thick Cr metallic base layer was formed by sputtering within an argon gas atmosphere; a 0.08 μm thick $Co_{70}Ni_{30}$ (atomic fraction) magnetic layer was formed thereupon; and a 0.03 μm thick carbon layer was formed as a protective film to provide laminated layers.

For comparison, a conventional magnetic disk was manufactured in accordance with the same method provided that no chromium oxide intermediate layer is formed on the same substrate.

The obtained two kinds of magnetic disks were tested for the durability against CSS, the test results being listed in Table 1 below.

TABLE 1

| Number of CSS | Ratio of reproduced output drop % | |
|---|---|---|
| | Inventive disk | Conventional disk |
| 10,000 | 0 | 0 |
| 20,000 | 0 | 0 |
| 30,000 | 0 | 5 |
| 40,000 | 0 | 20 |
| 50,000 | 5 | — |

Example 2

A scratch test was made for the two kind of magnetic disks obtained in Example 1, the test results being shown in Table 2. The adhesive strength was evaluated on the basis of film peeling-off produced when the disks were moved under various loads applied through a diamond tip of 10 μm diameter. In Table 2, the term "Scratches" implies that only scratches appeared on the protective film and the metallic layer formed on the substrate without occurrence of peeling-off. ner as in Example 1, provided that the substrate was

TABLE 2

| Load (g) | Appearance | |
|---|---|---|
| | Inventive disk | Conventional disk |
| 10 | Scratches | Scratches |
| 20 | " | " |
| 30 | " | " |
| 40 | " | Partial peeling-off |
| 50 | " | peeling-off |
| 60 | Partial peeling-off | " |

Further samples were prepared substantially in the same manner as in Example 1, provided that the substrate was changed to the glass-glazed alumina (like Example 4) and the thickness of the Cr-oxide layer was varied. According the same scratch test, a thickness of the Cr-oxide layer from 0.001 μm was excellent while a thickness range from 0.005 to 0.01 μm was unsatisfactory.

Example 3

A magnetic disk of the present invention was manufactured as follows: a 0.1 μm thick titanium oxide intermediate layer was formed on a 130 mm dia. substrate of $Al_2O_3$-TiC base ceramics (surface roughness: Ra of about 200 Å) by sputtering with a Ti target within a mixed atmosphere of oxygen and argon (ratio: 1:1) while stepwisely decreasing the amount of oxygen to be mixed with argon from 50% to 10%; then a 0.25 μm thick Cr base layer was formed by sputtering within an argon atmosphere; and a 0.07 μm thick $Co_{70}Ni_{30}$ magnetic layer and a 0.03 μm thick carbon protective layer were laminatedly formed thereon sequentially.

Figure 2:
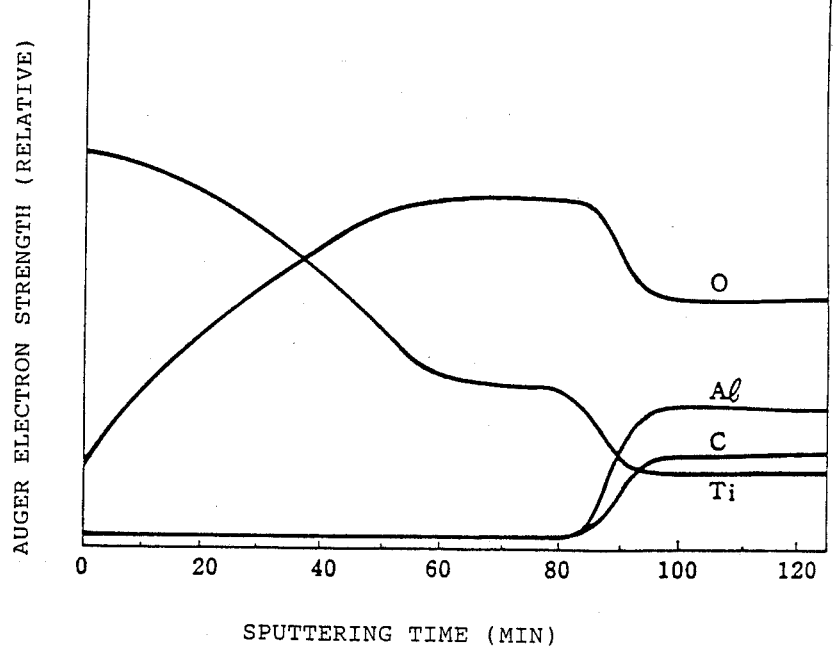
FIG. 2 is a graphical representation showing the relationship between the layer thickness (sputtering time) and the Auger electron strength of the intermediate layer of the magnetic disk constructed as shown in FIG. 1.

FIG. 2 shows the results of Auger electron spectroscopic analysis along the direction of depth of the intermediate layer formed in the same method. In FIG. 2, the abscissa indicates the sputtering time by $Ar^+$ ions to be measured, which corresponds to the direction of intermediate layer depth; while the ordinate indicates Auger electron strength (relative scale) which generally corresponds to the concentration of each element. This drawing indicates the tendency that the oxygen concentration in the intermediate layer decreases from the substrate side to the metallic base layer side.

Example 4

A magnetic disk of the present invention was manufactured as follows: an alumina substrate of 130 mm dia. was glazed with glass ($PbO-SiO_2-B_2O_3-Al_2O_3$) and polished to a surface roughness Ra of about 20 Å; a 0.02 μm thick tantalum oxide intermediate layer was formed thereon; by sputtering using a $Ta_2O_5$ target within an argon atmosphere; a 0.25 μm thick Cr metallic base layer was formed thereon by sputtering within an argon gas atmosphere; and a 0.07 μm thick $Co_{70}Ni_{30}$ magnetic layer and a 0.03 μm carbon protective layer were laminated thereon in sequence.

For comparison, a conventional magnetic disk manufactured in the same method, provided that no tantalum oxide intermediate layer was formed on the same substrate, was prepared.

The CSS test was made on the two kinds of magnetic disks thus obtained, the test results being shown in Table 3.

TABLE 3

| Number of CSS | Ratio of reproduced output drop % | |
|---|---|---|
| | Inventive disk | Conventional disk |
| 10,000 | 0 | 0 |
| 20,000 | 0 | 0 |
| 30,000 | 0 | 5 |
| 40,000 | 0 | 20 |
| 50,000 | 3 | — |

EXAMPLE 5

A magnetic disk of the present invention was manufactured as follows: an alumina substrate with an outer dia. 130 mm and an inner dia. 40 mm was glass glazed with and polished to a surface roughness Ra of about 20 Å; a 0.05 μm thick molybdenum oxide layer was formed thereon by sputtering using a Mo target within an oxygen and argon mixture atmosphere (ratio: 1:2) and further a 0.05 μm thick molybdenum layer was formed on the molybdenum oxide layer by sputtering within an argon gas atmosphere including no oxygen to form a Mo-oxide and Mo intermediate layer structure; a 0.25 μm thick Cr metallic base layer, a 0.07 μm thick $Co_{70}Ni_{30}$ magnetic layer and a 0.03 μm carbon protective film were laminated in sequence.

For comparison, a conventional magnetic disk manufactured in the same method, provided that no molybdenum based intermediate layer structure was formed on the same substrate, was prepared.

The CCS test was made on the two kinds of magnetic disks thus obtained, the test results being shown in Table 4.

TABLE 4

| Number of CSS | Ratio of reproduced output drop % | |
|---|---|---|
| | Inventive disk | Conventional disk |
| 10,000 | 0 | 0 |
| 20,000 | 0 | 0 |
| 30,000 | 0 | 5 |
| 40,000 | 0 | 20 |
| 50,000 | 5 | — |

EXAMPLE 6

A scratch test was made on the two kinds of magnetic disks obtained in Example 5, the test results being shown in Table 2. The adhesive strength was evaluated on the basis of film peeling-off produced when the disks were moved under various loads applied through a diamond tip of 10 μm diameter. In Table 5, the term "Scratches" implies that only scratches appeared on the protective film and the metallic layer formed on the substrate without occurrence of peeling-off.

TABLE 5

| Load (g) | Appearance | |
|---|---|---|
| | Inventive disk | Conventional disk |
| 10 | Scratches | Scratches |
| 20 | " | " |
| 30 | " | Partial peeling-off |
| 40 | " | peeling-off |
| 50 | Partial peeling-off | " |

EXAMPLE 7

A 0.2 μm thick Ti-Nb alloy (Ti: 85%, Nb: 15% by weight) layer was formed on an $Al_2O_3$-TiC base substrate with an outer diameter 130 mm and an inner diameter 40 mm by sputtering using a Ti-Nb composite target within an argon atmosphere; and further the layer was heat-treated at 600° C. for 20 minutes within a vacuum of $10^{-5}$ Torr or less.

Figure 4:
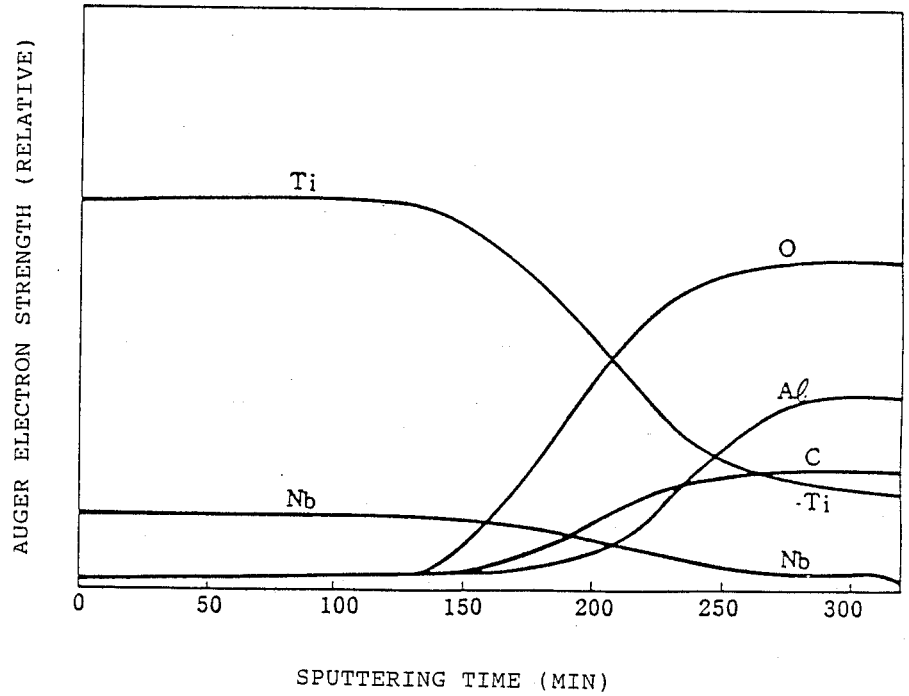
FIG. 4 is a graphical representation showing the relationship between the layer thickness (sputtering time) and the Auger electron strength of the intermediate layer structures of the magnetic disk constructed as shown in FIG. 3.

FIG. 4 shows the results of Auger electron spectroscopic analysis along the direction of depth of the metallized layer formed on the substrate. In FIG. 4, the abscissa indicates the sputtering time by $Ar^+$ ions to be measured, which corresponds to the direction of intermediate layer depth; while the ordinate indicates Auger electron strength (relative scale) which generally correspondds to the concentration of each element. This drawing indicates the tendency that the oxygen concentration in the Ti-Nb oxide layer decreases from the substrate side to the surface side and that a Ti-Nb alloy layer has been formed on the oxide layer.

Example 8

To manufacture a magnetic disk of the present invention on the magnetic disk material provided with an intermediate layer obtained in Example 7, a 0.25 μm thick Cr metallic base layer, a 0.07 μm thick $Co_{70}Ni_{30}$ magnetic layer and a 0.03 μm carbon protective layer were laminated in sequence by sputtering within an argon atmosphere.

For comparison, a covnentional magnetic disk manufactured in the same method, provided that no intermediate layer of the Ti-Nb oxide and the alloy was formed on the same substrate, was prepared.

The CSS test was made on the two kinds of magnetic disks thus obtained, the test results being shown in Table 6 below.

TABLE 6

| | Ratio of reproduced output drop % | |
|---|---|---|
| Number of CSS | Inventive disk | Conventional disk |
| 10,000 | 0 | 0 |
| 20,000 | 0 | 0 |
| 30,000 | 0 | 5 |
| 40,000 | 0 | 20 |
| 50,000 | 2 | — |

Example 9

A magnetic disk of the present invention was manufactured as follows: an alumina substrate having an outer diameter of 95 mm and an inner diameter of 25 mm was glazed with glass and polished to a surface roughness Ra of about 20 Å; a 0.01 μm thick chromium nitride intermediate layer was formed thereon by sputtering with a Cr target within an nitrogen and argon mixture atmosphere (ratio: 3:7); a 0.3 μm thick Cr metallic base layer was formed by sputtering within an argon gas atmosphere containing no nitrogen; a 0.08 μm thick $Co_{67.5}Ni_{25}Cr_{7.5}$ (atomic fraction) mangetic layer was formed thereupon; and a 0.03 μm thick carbon layer was formed as a protective film to provide laminated layers.

For comparison, a conventional magnetic disk was manufactured in accordance with the same method provided that no chromium nitride intermediate layer was formed on the same substrate.

The obtained two kinds of magnetic disks were subjected to the scratch test in the same manner as Example 2, the test results being listed in Table 7 below.

TABLE 7

| Load (g) | Appearance | |
|---|---|---|
| | Inventive disk | Conventional disk |
| 10 | Scratches | Scratches |
| 20 | " | " |
| 30 | " | " |
| 40 | " | peeling-off |
| 50 | Partial peeling-off | " |
| 60 | Peeling-off | " |

Similar experiments were repeated by varying the thickness of the Cr-nitride layer otherwise in the same manner as above. A thickness of 0.005 μm proved satisfactory while 0.001 to 0.002 μm unsatisfactory.

It should be understood that modification may be made without departing from the gist and scope of the present invention hereinabove disclosed and claimed in the appended claims.

What is claimed is:

1. A disk shaped magnetic recording medium comprising a metallic base layer and a magnetic layer laminatedly provided on a nonmagnetic nonmetallic substrate which is selected from among ceramics and glass and further comprising an intermediate layer which comprises a metal oxide layer consisting essentially of oxide(s) of at least one element selected from the group consisting of Ti, Zr, Hf, V, Nb, Ta, Cr, Mo, W and Mn, wherein the intermediate layer is located between said substrate and said metallic base layer.

2. The magnetic recording medium as set forth in claim 1, wherein oxygen concentration is said oxide layer along the thickness direction thereof decreases continuously toward said metallic base layer.

3. The magnetic recording medium as set forth in claim 1, wherein said oxide layer has a thickness ranging from 1/1000 to 5 times relative to that of said metallic base layer.

4. The magnetic recording medium as set forth in claim 1, wherein said oxide layer is Cr-oxide.

5. The magnetic recording medium as set forth in claim 4, wherein said Cr-oxide layer has a thickness less than 50 angstrom.

6. The magnetic recording medium as set forth in claim 1, wherein said nonmetallic substrate is glass-glazed ceramics.

7. The magnetic recording medium as set forth in claim 1, wherein said nonmetallic substrate is tempered glass.

8. The magnetic recording medium as set forth in claim 1, wherein oxygen concentration is said oxide layer along the thickness direction thereof decreases stepwise toward said metallic base layer.

9. A disk shaped magnetic recording medium comprising a metallic base layer and a magnetic layer laminatedly provided on a nonmagnetic nonmetallic substrate which is selected from among ceramics and glass and further comprising an intermediate layer structure comprising a metal oxide layer and a metal or alloy layer wherein the intermediate layer structure is located between said substrate and said metallic base layer, said metal oxide layer being disposed on said substrate and consisting essentially of the oxides of at least one element selected from the group consisting of Ti, Zr, Hf, V, Nb, Ta, Cr, No, W and Mn, and said metal or alloy layer being disposed on said metal oxide layer and consisting essentially of at least on element selected from the group consisting of Ti, Zr, Hf, V, Nb, Ta, Cr, Mo, W and Mn.

10. The magnetic recording medium as set forth in claim 9, wherein oxygen concentration in said oxide layer along the thickness direction thereof decreases continuously toward said metallic base layer.

11. The magnetic recording medium as set forth in claim 9, wherein said oxide layer has a thickness ranging from 1/1000 to 5 times relative to that of said metallic base layer 12. The magnetic recording medium as set forth in claim 9, wherein said metal or alloy layer has a thickness ranging from 1/10 to 10 times that of said oxide layer.

13. The magnetic recording medium as set forth in claim 9, wherein said oxide layer is Cr-oxide.

14. The magnetic recording medium as set forth in claim 13, wherein said Cr-oxide layer has a thickness less than 50 angstrom.

15. The magnetic recording medium as set forth in claim 9, wherein said nonmetallic substrate is glass-glazed ceramics.

16. The magnetic recording medium as set forth in claim 9, wherein said nonmetallic substrate is tempered glass.

17. The magnetic recording medium as set forth in claim 9, wherein oxygen concentration in said oxide layer along the thickness direction thereof decreases stepwise toward said metallic base layer.

18. A disk shaped magnetic recording medium comprising a metallic base layer and a magnetic layer laminatedly provided on a nonmagnetic nonmetallic substrate which is selected from among ceramics and glass and further comprising an intermediate layer comprising a metal nitride layer consisting essentially of nitride(s) of at least one element selected from the group consisting of Ti, Zr, Hf, V, Nb, Ta, Cr, Mo, W and Mn wherein the intermediate layer is located between said substrate and said metallic base layer.

19. The magnetic recording medium as set forth in claim 18, wherein nitrogen concentration in said nitride layer along the thickness direction thereof decreases continuously toward said metallic base layer.

20. The magnetic recording medium as set forth in claim 18, wherein said nitride is Cr-nitride.

21. The magnetic recording medium as set forth in claim 18, wherein nitrogen concentration in said nitride layer along the thickness direction thereof decreases stepwise toward said metallic base layer.

22. A disk shaped magnetic recording medium comprising a metallic base layer and a magnetic layer laminatedly provided on a nonmagnetic nonmetallic substrate which is selected from among ceramics and glass and further comprising an intermediate layer structure which comprises a metal nitride layer and a metal or alloy layer wherein the intermediate layer structure is located between said substrate and said metallic base layer, said metal nitride layer being disposed on said substrate and consisting essentially of nitrate of at least on element selected from the group consisting of Ti, Zr, Hf, V, Nb, Ta, Cr, Mo, W and Mn, and said metal or alloy layer being disposed on said metal nitride layer and consisting essentially of at least one element selected from the group consisting of Ti, Zr, Hf, V, Nb, Ta, Cr, Mo, W and Mn.

23. The magnetic recording medium as set forth in claim 22, wherein nitrogen concentration in said nitride layer along the thickness direction thereof decreases continuously toward said metallic base layer.

24. The magnetic recording medium as set forth in claim 22, wherein said nitride is Cr-nitride.

25. The magnetic recording medium as set forth in claim 22, wherein nitrogen concentration in said nitride layer along the thickness direction thereof decreases stepwise toward said metallic base layer.

* * * * *